United States Patent [19]

Moteki et al.

[11] Patent Number: 5,093,429

[45] Date of Patent: Mar. 3, 1992

[54] MULTIPLEX ETHYLENE COPOLYMER, PROCESS FOR PREPARATION THEREOF AND CURED PRODUCT THEREOF

[75] Inventors: Yoshihiro Moteki; Toshiyuki Iwashita; Hitoshi Funada, all of Oita; Naotoshi Watanabe, Kawasaki, all of Japan

[73] Assignee: Showa Denko K.K., Tokyo, Japan

[21] Appl. No.: 480,382

[22] Filed: Feb. 15, 1990

Related U.S. Application Data

[63] Continuation of Ser. No. 98,767, Sep. 17, 1987, abandoned, which is a continuation of Ser. No. 824,686, Jan. 21, 1986, abandoned.

[30] Foreign Application Priority Data

May 21, 1984 [JP] Japan ................... 59-100391
May 21, 1985 [WO] PCT Int'l Appl. ...... PCT/JP85/00276

[51] Int. Cl.$^5$ ............... C08F 8/46; C08F 8/34; C08F 8/30; C08F 8/14
[52] U.S. Cl. .................... 525/293; 525/298; 525/301; 525/354; 525/303; 525/327.8; 525/326.7; 525/327.7; 525/327.3; 525/328.3; 525/317.4; 525/327.5; 525/329.7; 525/327.6; 525/330.1; 525/327.9; 525/379; 525/384; 525/386
[58] Field of Search ............. 525/293, 298, 301, 303, 525/326.7, 327.5, 327.7, 328.3, 327.3, 327.6, 327.4, 329.7, 330.1, 327.8, 327.9

[56] References Cited

U.S. PATENT DOCUMENTS 2,977,334  3/1961  Zopf .................. 525/327.6
3,035,027  5/1962  Tawney .............. 526/262
3,925,326  12/1975 Logothetis ........... 526/280

FOREIGN PATENT DOCUMENTS 1548232  7/1979  United Kingdom.

Primary Examiner—Christopher Henderson
Attorney, Agent, or Firm—Sughrue, Mion, Zinn Macpeak & Seas

[57] ABSTRACT

Disclosed is a multiplex ethylene coplymer comprising (a) 50 to 94.8 mole % of units derived from ethylene, which are represented by the following formula (I):

$$-CH_2-CH_2- \qquad (I)$$

(b) 5 to 45 mole % of units derived from a monomer selected from alkyl acrylates, alkyl methacrylates, vinyl carboxylates and isopropenyl carboxylates, which are represented by the following formula (II):

$$-CH_2-\underset{X}{\overset{R_1}{\underset{|}{\overset{|}{C}}}}- \qquad (II)$$

wherein $R_1$ stands for a hydrogen atom or a methyl group, and X is $$-\underset{O}{\overset{\|}{C}}-O-R_2 \text{ or } -O-\underset{O}{\overset{\|}{C}}-R_3$$

in which $R_2$ and $R_3$ stand for an alkyl group having 1 to 10 carbon atoms), and (c) 0.2 to 5 mole % of units derived from a monomer having a radical-polymerizable ethylenic double bond and at least one carbon-to-carbon double bond which is different from a double bond of an aromatic nucleus. This ethylene copolymer can be easily cured, and the cured copolymer is a rubber having excellent oil resistance and heat resistance.

This multiplex ethylene copolymer can be obtained by copolymerizing a monomer forming the units (a) with a monomer forming the units (b) and (c') a monomer having a radical-polymerizable ethylenic double bond and an acid anhydride group, a carboxyl group and/or an epoxy group, and modifying the obtained copolymer with a low-molecular-weight modifier selected from unsaturated amines and unsaturated alcohols having at least one carbon-to-carbon double bond different from a double bond of an aromatic nucleus (when a radical-polymerizable monomer having an epoxy group is used, the low-molecular-weight modifier may be an unsaturated carboxylic acid having at least one carbon-to-carbon double bond different from a double bond of an aromatic nucleus).

2 Claims, No Drawings

MULTIPLEX ETHYLENE COPOLYMER, PROCESS FOR PREPARATION THEREOF AND CURED PRODUCT THEREOF

This is a continuation of application No. 07/098,767 filed Sept. 17, 1987, now abandoned, which is a continuation of U.S. Ser. No. 06/824,686, filed Jan. 21, 1986 now abandoned.

DESCRIPTION

1. Technical Field

The present invention relates to a curable ethylene copolymer, a process for the preparation thereof and a cured product thereof. More particularly, the present invention relates to a curable ethylene copolymer which can provide, by ordinary sulfur curing or peroxide curing, an elastomer having excellent heat resistance, solvent resistance, weatherability, ultraviolet ray resistance, ozone resistance and low-temperature characteristics, a process for the preparation thereof, and a cured product thereof obtained by sulfur curing or peroxide curing.

2. Background Art

Rubbers excellent in such physical properties as heat resistance and oil resistance are now desired mainly in the field of automobile parts. As one elastomer meeting the requirements of the physical properties, a copolymer of ethylene with a monomer having a polar group, such as an acrylic acid ester, is manufactured on an industrial scale and is utilized in various fields. Various preparation processes and physical properties are known in connection with this elastomer.

For example, U.S. Pat. No. 3,956,248 discloses a process in which an alternating copolymer of ethylene with an alkyl acrylate and a halogen-containing acrylate is prepared in the presence of a special catalyst. It is stated that according to this process, an elastomer having excellent oil resistance and heat resistance can be obtained by crosslinking with a peroxide or curing with hexamethylene diamine carbamate.

U.S. Pat. No. 3,883,472 discloses a process in which an acrylate/1,4-butenedionic acid monoester copolymer or a terpolymer thereof with ethylene is crosslinked with a polyamine and a curing promoter. Furthermore, U.S. Pat. No. 3,904,588 discloses a process in which a similar terpolymer is cured with hexamethylene diamine carbamate.

Moreover, U.S. Pat. No. 4,304,887 and U.S. Pat. No. 4,307,007 propose that a chromium (III) compound or a phosphate is added as an agent for improving the green strength or an anti-blocking agent to a terpolymer as described above.

Moreover, U.S. Pat. No. 4,399,263 proposes the combined use of a monoamine with a polyamine for improving the storage stability or scorching property.

Furthermore, U.S. Pat. No. 4,412,043 proposes a process in which an ethylene/acrylate/4-dialkylamino-4-oxo-2-butanoic acid copolymer obtained by reacting a terpolymer such an ethylene/acrylate/maleic anhydride terpolymer with a dialkylamine is cured with a diamine or a polyamine.

As is apparent from the foregoing description, ethylene/acrylate copolymer elastomers are prepared by using carboxyl groups present in the polymer chain as curing sites and curing them with a diamine, a polyamine or a derivative thereof. A monoamine is added to reduce the amount of remaining carboxyl groups for improving the storage stability or scorching property. Accordingly, in the conventional techniques, trials have not been made to introduce carbon-to-carbon double bonds as sulfur-curable sites into the polymer chain by copolymerization or modification or to cure such a copolymer with sulfur.

Since crosslinking sites are carboxyl groups in the above-mentioned curable copolymer, the copolymer can be crosslinked with a diamine or with an ion. However, for example, in the case of a uncrosslinked rubber composition formed by kneading a diamine or a polyamine into this copolymer, crosslinking reaction is readily advanced even at normal temperature and hence, the storage stability is poor. Moreover, scorching is readily caused during the crosslinking operation.

We carried out research with a view to providing an ethylene copolymer readily curable with sulfur by using the conventional equipment and technique, and as the result, it has been found that by introducing carbon-to-carbon double bonds as sulfur-curing sites into the polymer chain, there can be obtained a rubber which can be easily cured with sulfur to provide a cured product having excellent oil resistance and heat resistance.

DISCLOSURE OF THE INVENTION

In accordance with one aspect of the present invention, there is provided a multiplex ethylene copolymer comprising (a) 50 to 94.8 mole% of units derived from ethylene, which are represented by the following formula (I):

$$-CH_2-CH_2- \hspace{2cm} (I)$$

(b) 5 to 45 mole% of units derived from a monomer selected from alkyl acrylates, alkyl methacrylates, vinyl carboxylates and isopropenyl carboxylates, which are represented by the following formula (II):

$$\begin{array}{c} R_1 \\ | \\ -CH_2-C- \\ | \\ X \end{array} \hspace{2cm} (II)$$

wherein $R_1$ stands for a hydrogen atom or a methyl group, and X is

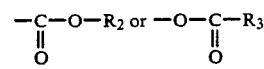

$$-\underset{O}{\overset{\|}{C}}-O-R_2 \text{ or } -O-\underset{O}{\overset{\|}{C}}-R_3$$

(in which $R_2$ and $R_3$ stand for an alkyl group having 1 to 10 carbon atoms), and (c) 0.2 to 5 mole% of units derived from a monomer having a radical-polymerizable ethylenic double bond and at least one carbon-to-carbon double bond which is different from a double bond of an aromatic nucleus.

In accordance with another aspect of the present invention, there is provided a process for the preparation of a modified multiplex ethylene copolymer, which comprises modifying a multiplex ethylene copolymer comprising (a) 50 to 94.8 mole% of units derived from ethylene, which are represented by the following formula (I):

$$-CH_2-CH_2- \hspace{2cm} (I)$$

(b) 5 to 45 mole% of units derived from a monomer selected from alkyl acrylates, alkyl methacrylates, vinyl carboxylates and isopropenyl carboxylates, which are represented by the following formula (II):

$$-CH_2-\underset{\underset{X}{|}}{\overset{\overset{R_1}{|}}{C}}-\quad (II)$$

wherein $R_1$ stands for a hydrogen atom or a methyl group, and X is $$-\underset{\underset{O}{\|}}{C}-O-R_2 \text{ or } -O-\underset{\underset{O}{\|}}{C}-R_3$$

(in which $R_2$ and $R_3$ stand for an alkyl group having 1 to 10 carbon atoms),
and (c) 0.2 to 5 mole% of units derived from a radical-polymerizable monomer containing an acid anhydride group, a carboxyl group or an epoxy group with at least one low-molecular-weight modifier selected from unsaturated amines and unsaturated alcohols having at least one carbon-to-carbon double bond different from a double bond of an aromatic nucleus (with the proviso that when a radical-polymerizable monomer containing an epoxy group is used, the low-molecular-weight modifier may be an unsaturated carboxylic acid having at least one carbon-to-carbon double bond different from a double bond of an aromatic nucleus).

The above-mentioned multiplex ethylene copolymer is cured with sulfur and/or a sulfur donor or crosslinked with a peroxide to form a rubbery copolymer having excellent oil resistance and heat resistance.

BEST MODE FOR CARRYING OUT THE INVENTION

In the multiplex ethylene copolymer of the present invention, the amount of ethylene units represented by the formula (I) is 50 to 94.8 mole%, preferably 53 to 86.6 mole%. If the amount of ethylene units represented by the formula (I) is too small, the low-temperature characteristics of the cured product are degraded, and if the amount of ethylene units represented by the formula (I) is too large, the permanent elongation or compression permanent strain of the cured product is increased and the rubbery elasticity is decreased.

In the multiplex ethylene copolymer of the present invention, the units represented by the formula (II) are derived from a monomer selected from alkyl acrylates and alkyl methacrylates having 1 to 10 carbon atoms in the alkyl group and vinyl esters and isopropenyl esters of aliphatic monocarboxylic acids having 2 to 11 carbon atoms. The amount of the units represented by the formula (II) is 5 to 45 mole%, preferably 10 to 45 mole%, especially preferably 13 to 45 mole%. If the amount of the units represented by the formula (II) is smaller than 5 mole%, the rubbery elasticity of the cured product is lost and the tension permanent set or compression permanent set is increased. In contrast, if the amount of the units represented by the formula (II) exceeds 45 mole%, the low-temperature brittleness characteristics of the cured product are degraded.

In the multiplex ethylene copolymer of the present invention, as the units derived from a monomer having a radical-polymerizable ethylenic double bond and at least one carbon-to-carbon double bond different from a double bond of an aromatic nucleus, there are generally used units derived from monomers containing at least one atom selected from oxygen and nitrogen in the molecule. Preferred units are represented by the following formula (III):

$$-\underset{\underset{R_4}{|}}{CH}-\underset{\underset{\underset{R_8}{|}}{Y}}{\overset{\overset{R_7}{|}}{C}}-\quad (III)$$

wherein $R_4$ stands for a hydrogen atom or $$-\underset{\underset{O}{\|}}{C}-O-R_6$$

(in which $R_6$ stands for a hydrogen atom or an alkyl group having 1 to 6 carbon atoms), $R_7$ stands for a hydrogen atom or a methyl group, $R_8$ stands for a hydrocarbon residue having up to 40 carbon atoms, which contains at least one carbon-to-carbon double bond different from a double bond of an aromatic nucleus, and Y is a divalent group selected from divalent groups represented by the following formulae (IV) through (IX):

$$-\underset{\underset{O}{\|}}{C}-O-, \quad (IV)$$

$$-O-\underset{\underset{O}{\|}}{C}-, \quad (V)$$

$$-O-, (VI)$$

$$-\underset{\underset{O}{\|}}{C}-\underset{\underset{R_9}{|}}{N}-, \quad (VII)$$

$$-\underset{\underset{O}{\|}}{C}-O-CH_2-\underset{\underset{OH}{|}}{CH}-CH_2-Q- \quad (VIII)$$

and $$-\underset{\underset{O}{\|}}{C}-O-CH_2-\underset{\underset{CH_2OH}{|}}{CH}-Q- \quad (IX)$$

wherein Q in the formulae (VIII) and (IX) is $-NR_9-$, $$-O-\underset{\underset{O}{\|}}{C}- \text{ or } -O-,$$

and $R_9$ in the formula (VII) and the definition of Q stands for a hydrocarbon residue having up to 40 carbon atoms, which contains at least one carbon-to-carbon double bond different from a double bond of an aromatic nucleus, an alkyl, aryl or aralkyl group having up to 20 carbon atoms or a hydrogen atom.

More preferable units are selected from units represented by the following formulae (X), (XI), (XII) and (XVI):

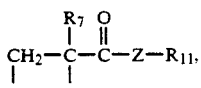 (X)

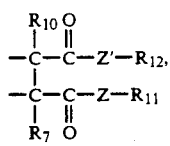 (XI)

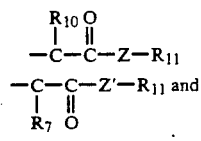 (XII)

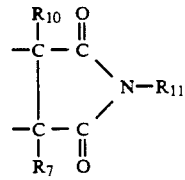 (XVI)

wherein $R_7$ and $R_{10}$ stand for a hydrogen atom or a methyl group, $R_{11}$ stands for a hydrocarbon residue having 6 to 20 carbon atoms, which contains a carbon-to-carbon double bond different from a double bond of an aromatic nucleus, $R_{12}$ stands for a hydrogen atom or an alkyl group having 1 to 10 carbon atoms, and Z and Z' independently stand for

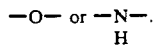

The units derived from the radical-polymerizable monomer are contained in the copolymer in an amount of 0.2 to 5 mole%, preferably 0.5 to 5 mole%. If the amount of the units is smaller than 0.2 mole%, even when curing is sufficiently carried out, a cured product having desired rubbery elasticity and heat resistance cannot be obtained. In contrast, if the amount of the units exceeds 5 mole%, the softness of the cured product is degraded and the intended rubbery properties cannot be obtained.

The multiplex ethylene copolymer may contain units derived from other monomer in addition to the units represented by the formula (I), the units represented by the formula (II) and the units derived from the radical-polymerizable monomer. The amount of the units derived from other monomer is up to 20 mole%.

The multiplex ethylene copolymer of the present invention can be prepared according to processes described below, which are roughly divided into two types. According to the first process, ethylene forming units represented by the formula (I) is copolymerized with a monomer forming units represented by the formula (II) and a monomer comprising a radical-polymerizable ethylenic double bond and at least one carbon-to-carbon double bond different from a double bond of an aromatic nucleus According to the second process, ethylene forming units represented by the formula (I) is copolymerized with a monomer forming units represented by the formula (II) and a monomer having a radical-polymerizable ethylenic double bond and a functional group selected from an acid anhydride group, a carboxyl group and an epoxy group to form a multiplex ethylene copolymer having such a functional group, and the copolymer is modified with a low-molecular-weight modifier having an amino group, hydroxyl group or carboxyl group capable of reacting with the functional group to introduce a carbon-to-carbon double bond as the curing site into the side chain of the polymer. According to a modification of the second process, ethylene forming units represented by the formula (I) is copolymerized with a monomer forming units represented by the formula (II), the obtained copolymer is graft-polymerized with a monomer having a functional group selected from an acid anhydride group, a carboxyl group and an epoxy group, and the grafted copolymer is modified with a low-molecular-weight modifier as described above.

In the first process for the preparation of the multiplex ethylene copolymer, (i) ethylene forming units represented by the formula (I) is copolymerized with (ii) a monomer forming units represented by the formula (II) (that is, a monomer selected from alkyl acrylates and alkyl methacrylates having 1 to 10 carbon atoms and vinyl esters and isopropenyl esters of aliphatic monocarboxylic acids having 2 to 11 carbon atoms) and (iii) a monomer having a radical-polymerizable ethylenic double bond and at least one carbon-to-carbon double bond different from a double bond of an aromatic nucleus, preferably a monomer represented by the following formula (III'):

 (III')

wherein $R_4$, $R_7$, Y and $R_8$ are as defined above in the formula (III).

It is especially preferred that the radical-polymerizable monomer (iii) be selected from monomers represented by the following formulae (X'), (XI'), (XII') and (XVI'):

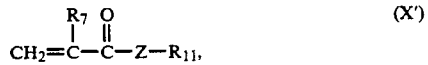 (X')

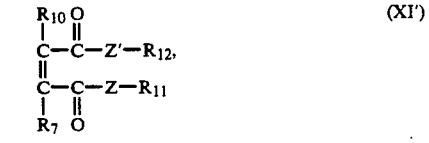 (XI')

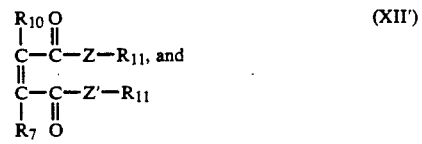 (XII')

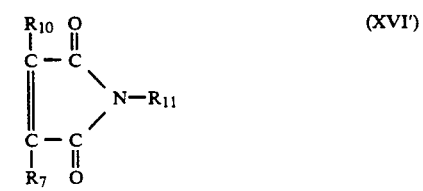 (XVI')

wherein $R_7$, $R_{10}$, $R_{12}$, Z and Z' are as defined above in the formulae (X), (XI), (XII) and (XVI).

As examples of the radical-polymerizable monomers represented by the formulae (III'), (X'), (XI'), (XII') and (XVI'), there can be mentioned the following compounds (a) through (h).

(a) Acrylic acid esters or methacrylic acid esters comprising as the alcohol component an alcohol having at least one carbon-to-carbon double bond different from a double bond of an aromatic nucleus and up to 40 carbon atoms, in which Y in the formula (III') is equal to the formula (IV), such as oleyl acrylate and oleyl methacrylate.

(b) Monoesters and diesters of maleic acid or methylmaleic acid (citraconic acid) having as the alcohol component an alcohol having at least one carbon-to-carbon double bond different from a double bond of an aromatic nucleus and up to 40 carbon atoms, in which Y in the formula (III') is equal to the formula (IV), such as oleyl maleate.

(c) Acrylamides or methacrylamides having as the amine component an amine having at least one carbon-to-carbon double bond different from a double bond of an aromatic nucleus and up to 40 carbon atoms, in which Y in the formula (III') is equal to the formula (VII), such as N-9-octadecenyl acrylamide.

(d) Monoamides and diamides of maleic acid or methylmaleic acid (citraconic acid) having as the amine component an amine having at least one carbon-to-carbon double bond different from a double bond of an aromatic nucleus, in which Y in the formula (III') is equal to the formula (VII), (XI') or (XII''), such as 4-octadecenylamino-4-oxo-2-butenoic acid.

(e) Vinyl esters and isopropenyl esters of unsaturated carboxylic acids having at least one carbon-to-carbon double bond different from a double bond of an aromatic nucleus and up to 41 carbon atoms, in which Y in the formula (III') is equal to the formula (V), such as vinyl oleate and vinyl ricinoleate.

(f) Alkenyl, vinyl or isopropenyl ethers having at least one carbon-to-carbon double bond different from a double bond of an aromatic nucleus and up to 40 carbon atoms, in which Y in the formula (III') is equal to the formula (VI), such as 9-octadecenyl vinyl ether, divinyl ether and diallyl ether.

(g) Reaction products between glycidyl acrylate or methacrylate and an unsaturated amine, unsaturated alcohol or unsaturated carboxylic acid, in which Y in the formula (III') is equal to the formula (VIII) or (IX).

(h) Imides having at least one carbon-to-carbon double bond different from a double bond of an aromatic nucleus, which corresponds to the formula (XVI'), such as 9-octadecenylmaleimide.

In the above-mentioned first preparation process, the copolymerization ratios of the respective monomers are set so that the ethylene copolymer having the above-mentioned composition can be obtained.

As specific examples of the monomer forming the units represented by the formula (II), there can be mentioned methyl acrylate, methyl methacrylate, ethyl acrylate, ethyl methacrylate, propyl acrylate, propyl methacrylate, butyl acrylate, 2-ethylhexyl acrylate, 2-ethylhexyl methacrylate, butyl methacrylate, vinyl acetate and vinyl propionate. Methyl methacrylate, methyl acrylate, ethyl acrylate and vinyl acetate are especially preferred.

The copolymerization may be carried out at 50° to 200° C. under 5 to 200 kg/cm² in the presence of an organic solvent such as benzene, toluene, hexane or heptane, or at 120° to 260° C. under 500 to 2,500 kg/cm² in the absence of a solvent. As the polymerization initiator, there may be used t-butyl perpivalate, t-butyl peroxide, 2,5-dimethyl-di-t-butyl peroxide, benzoyl peroxide and azobisisobutyronitrile. The contents (mole%) of the structural units (I), (II) and (III) can be controlled by appropriately selecting the ratio of the reacted monomers according to the kinds of monomers used and the copolymerization reaction conditions, and for example, the melt index (MI) of the copolymer may be adjusted by controlling the kind and amount of the polymerization initiator according to the kinds of monomers used and the copolymerization reaction conditions.

In the second preparation process, at first, ethylene forming the units represented by the formula (I) is copolymerized with a monomer forming the units represented by the formula (II) and a radical-polymerizable monomer having functional group selected from an acid anhydride group, a carboxyl group and an epoxy group to form an ethylene copolymer having a functional group. Alternately, ethylene forming the units represented by the formula (I) is copolymerized with a monomer forming the units represented by the formula (II), and the obtained copolymer is graft-polymerized with a radical-polymerizable monomer having a functional group selected from an acid anhydride group, a carboxyl group and an epoxy group.

As the radical-polymerizable monomer having an acid anhydride group as the functional group, there can be mentioned maleic anhydride, norbornene-dicarboxylic anhydride and cyclohexene-dicarboxylic anhydride, and maleic anhydride is preferred. As the radical-polymerizable monomer having a carboxyl group as the functional group, there can be mentioned acrylic acid, methacrylic acid, maleic acid, fumaric acid, monomethyl maleate and monoethyl maleate As the monomer having an epoxy group, there can be mentioned glycidyl acrylate and glycidyl methacrylate.

The copolymerization procedures in the second preparation process may be the same as those in the first preparation process. The graft polymerization with a monomer such as maleic anhydride may be carried out in the presence of a radical polymerization initiator by using a kneading machine such as a Banbury mixer or a vent type single or twin screw extruder.

In the second preparation process, the copolymerization ratios of the respective monomers can be set as in the first preparation process. The monomer forming the units represented by the formula (II) may be selected from the compounds specifically mentioned above with respect to the first preparation process.

According to a modification of the second process for preparing a multiplex ethylene copolymer comprising the units represented by the formula (I), the units represented by the formula (II) and the units derived from a monomer having a carboxyl group, ethylene is copolymerized with an alkyl acrylate or alkyl methacrylate forming the units represented by the formula (II), and the units of the formula (II) (possessed by the ester groups) in the obtained copolymer are partially hydrolyzed to convert some ester groups to carboxyl groups. This hydrolysis can be accomplished by treating the copolymer with a saponifying agent such as an alkali metal hydroxide, an alkaline earth metal hydroxide, an alcoholate, an alkali metal salt of a weak carboxylic acid or an alkali metal salt of a weak inorganic acid. The copolymer treated with the saponifying agent is treated with an acid to effect neutralization.

The melt index (measured at a temperature of 190° C. and a load of 2.16 kg according to JIS K-7210; hereinafter referred to as "MI") of the ethylene copolymer is ordinarily 0.01 to 1000 g/10 min, preferably 0.1 to 500 g/10 min, especially preferably 0.1 to 300 g/10 min. When a copolymer having an MI smaller than 0.01 g/10 min is used, when sulfur, a sulfur donor or other additive is added for curing, homogeneous mixing is difficult and the moldability is poor.

Then, the copolymer or grafted copolymer is treated with a low-molecular-weight modifier having an amino group and/or a hydroxyl group (which may have a carboxyl group in addition to the amino group and/or hydroxyl group when the radical-polymerizable monomer (iii) is a monomer having an epoxy group) and having a carbon-to-carbon double bond different from a double bond of an aromatic nucleus to react it with the functional group, whereby carbon-to-carbon double bonds are introduced as the curing sites in the side chains of the polymer.

As the low-molecular-weight modifiers having amino, hydroxyl and carboxyl groups, there may be used unsaturated amines, unsaturated alcohols and unsaturated carboxylic acids (in the case where a monomer containing an epoxy group is used as the radical-polymerizable monomer (iii)) having at least one carbon-to-carbon double bond different from a double bond of an aromatic nucleus. These modifiers will now be described.

Unsaturated Amine

The unsaturated amine used in the present invention is a compound having at least one carbon-to-carbon double bond different from a double bond of an aromatic nucleus and an amino group, and a compound represented by the following general formula is especially preferred:

wherein $R_{15}$ and $R_{16}$ stand for a hydrogen atom, or at least one of them is a hydrocarbon group having at least one double bond, with the proviso that the case where both of them simultaneously stand for a hydrogen atom is excluded.

In the above general formula, each hydrocarbon group has up to 40 carbon atoms, and a hydrocarbon group having up to 30 carbon atoms, especially 1 to 20 carbon atoms, is preferred. Furthermore, an unsaturated amine which is liquid or solid at normal temperature or a reaction temperature described below, is preferred.

As typical instances of the unsaturated amine, there can be mentioned 1-amino-9-nonadecene, 1-amino-9-octadecene, 1-amino-7-hexadecene, 1-amino-5-pentadecene, 1-amino-4-tetradecene, 1-amino-4-tridecene, 1-amino-3-dodecene, 1-amino-2-decene, 1-amino-2-octene, 1-amino-2-hexene, aminoethyl acrylate and diallyl amine. Among these amines, 1-amino-9-octadecene is especially preferred.

Unsaturated Alcohol

The unsaturated alcohol used in the present invention is a compound having at least one double bond different from a double bond of an aromatic nucleus and having a hydroxyl group. The carbon number is up to 40, and it is preferred that the carbon number be up to 30, more preferably up to 25. An aliphatic or aromatic compound having one hydroxyl group is preferred.

As typical instances of the unsaturated alcohol, there can be mentioned unsaturated aliphatic alcohols such as 1-hydroxy-9-octadecene, 1-hydroxy-7-heptadecene, 1-hydroxy-5-tetradecene, 1-hydroxy-5-dodecene, 1-hydroxy-3-octene, allyl alcohol and hydroxyethyl methacrylate, and unsaturated aromatic alcohols (or phenols) such as p-vinylphenol, vinylhydroxybiphenyl and vinylnaphthol.

Unsaturated Carboxylic Acid

The unsaturated carboxylic acid that can be used in the present invention when a monomer containing an epoxy group is used as the radical-polymerizable monomer (iii) is an unsaturated carboxylic acid having a carbon-to-carbon double bond different from a double bond of an aromatic nucleus and having 3 to 40 carbon atoms. As typical instances, there can be mentioned acrylic acid, methacrylic acid, oleic acid, linoleic acid, linolenic acid, clupanodonic acid, ricinoleic acid and pimaric acid. Among these acids, methacrylic acid is especially preferred.

In the ethylene copolymer, the amount of the low-molecular-weight modifier such as the unsaturated amine, unsaturated alcohol or unsaturated carboxylic acid is 0.2 to 5.0 mole, preferably 0.2 to 2.0 moles, more preferably 0.5 to 2.0 moles, per mole of the total amount of the structural units derived from the radical-polymerizable monomer having a functional group. If the amount of the low-molecular-weight modifier is smaller than 0.2 mole per mole of the total amount of the structural units derived from the radical-polymerizable monomer having a functional group, a modified ethylene copolymer having a desired modifying effect cannot be obtained. On the other hand, if the amount of the modifier exceeds 5.0 moles per mole of the total amount of the radical-polymerizable monomer, the unreacted unsaturated amine or unsaturated alcohol remains in the modified ethylene copolymer to cause bleeding or smelling. The modification with the low-molecular-weight modifier is accomplished, for example, according to the following procedures.

More specifically, the ethylene copolymer having the above-mentioned specific structure and the modifier are dissolved in a solvent and the solution is heated at 50° to 200° C., or the copolymer and modifier are not dissolved in a solvent but are kneaded at a temperature of at least the melting point of the ethylene copolymer but lower than the thermal decomposition temperature (that is, 120° to 300° C.) for 0.5 to 20 minutes (preferably 3 to 15 minutes) by a kneading machine such as a Banbury mixer or a vent type single or twin screw extruder. Note, a small amount of a catalyst may be used for the modification.

The MI of the modified ethylene copolymer is ordinarily 0.01 to 1000 g/10 min, and preferably 0.05 to 50 g/10 min, especially preferably 0.1 to 300 g/10 min. If MI of the modified ethylene copolymer is smaller than 0.01 g/10 min, when the modified copolymer is mixed with additives described below and, sulfur, sulfur donors, peroxides and curing promoters, the kneading property is poor and the moldability is degraded

CAPABILITY OF EXPLOITATION IN INDUSTRY

The ethylene copolymer of the present invention may be cured with sulfur or a sulfur donor or crosslinked with a peroxide.

The cured product obtained by curing has a very rich rubbery elasticity and the permanent elongation is lower than 45% at room temperature (20° C.). Furthermore, the weatherability is extremely excellent, and when the cured product is allowed to stand at 190° C. for more than 70 hours, the residual ratio of the elongation at break is at least 50%. Moreover, the cured product has an extremely excellent in oil resistance, heat resistance, solvent resistance and low-temperature brittleness resistance. Accordingly, the cured product is especially suitable for the production of hoses and packings to be arranged around an automobile engine. Moreover, the cured product is suitable for hoses to be used in cold districts and for the soles of boots.

Curing with sulfur or a sulfur donor may be carried out according to the following procedures. Ordinarily, the ethylene copolymer is kneaded with sulfur or a sulfur donor and other additives, for example, a curing assistant such as zinc flower, a filler such as carbon black, titanium while ($TiO_2$) or calcium carbonate ($CaCO_3$), a plasticizer such as a fatty acid ester, a polyester type plasticizer or a polybutene oligomer and a parting agent such as stearic acid by using a kneader or the like. As in the case of ordinary rubbers, kneading is carried out at a temperature higher than 30° C. The mixture is molded into a sheet or other optional intended shape by using a roll, a calender roll or an extruder, and the molded body is steam-cured or press-cured to obtain a cured product.

Sulfur or the sulfur donor is used in an amount of 0.1 to 10 parts by weight per 100 parts by weight of the ethylene copolymer. Curing promoters customarily used in the art of rubbers, such as aldehyde-ammonia type promoters, aldehyde-amine type promoters, thiourea type promoters, guanidine type promoters, thiazole type promoters, sulfenamide type promoters, thiuram type promoters, dithiocarbamate type promoters, xanthate type promoters, oxime type promoters and morpholine type promoters, are ordinarily used as the sulfur donor. As specific examples, there can be mentioned tetramethylthiuram disulfide, dipentamethylenethiuram tetrasulfide, 2-mercaptobenzothiazole and 2-(4'-morpholinodithio)benzothiazole.

Curing with a peroxide may be carried out according to customary procedures by using peroxides customarily used, for example, ketone peroxides such as methylethyl ketone peroxide, diacyl peroxides such as benzoyl peroxide, hydroperoxides such as t-butyl hydroperoxide, dialkyl peroxides such as dicumyl peroxide, and alkyl peresters such as t-butyl peracetate. For example, the copolymer is kneaded with a peroxide and a crosslinking assistant in a laboratory plastomill at a temperature lower than the decomposition temperature of the crosslinking agent for a short time (3 to 40 minutes). The mixture is placed in a mold and crosslinked at a temperature higher than the decomposition temperature by a press.

The amount of the peroxide used is 0.0005 to 0.02 mole per 100 g of the ethylene copolymer. If the crosslinking agent is used in combination with the peroxide, the amount of the peroxide used can be reduced and the physical properties of the cured product can be improved. Ordinarily, 0.0001 to 0.002 mole of the peroxide and 0.5 to 5 g of the crosslinking agent are used per 100 g of the ethylene copolymer. As the crosslinking assistant, there can be used, for example, polyfunctional monomers such as triallyl isocyanurate, triallyl cyanurate, diallyl phthalate, triallyl trimethacrylate and trimethylolpropane methacrylate.

The present invention will now be described in detail with reference to the following examples that by no means limit the scope of the invention.

The physical properties of the products obtained in the following examples were evaluated according to the following methods.

The melt index (MI) of the ethylene copolymer was measured at a temperature of 190° C. and a load of 2.16 kg according to the method of JIS K-7210.

The conversion of the unsaturated amine or unsaturated alcohol was calculated by extracting the modified ethylene copolymer with a non-solvent by using a Soxhlet extractor and determining the amount of the unreacted amine or alcohol in the extract by gas chromatography. Similarly, the conversion was calculated by extracting the modified ethylene copolymer with a non-solvent (carbon tetrachloride/methyl alcohol liquid mixture having a volume ratio of 6/4) by using a Soxhlet extractor and determining the iodine value of the unreacted unsaturated amine or unsaturated alcohol in the extract.

The tensile test was carried out according to JIS K-6301. The Shore hardness (A) was measured according to JIS K-6301. The heat resistance was tested by allowing the sample to stand at a temperature of 190° C. for 79 hours and measuring the elongation according to JIS K-6301. The Izod impact strength was measured according to ASTM D-256.

The maleic anhydride content was determined by the nuclear magnetic resonance and infrared absorption spectrum methods.

EXAMPLES 1 AND 3 AND COMPARATIVE EXAMPLES 1 AND 2

(Preparation of Modified Ethylene Copolymer)

Ethylene was copolymerized with methyl methacrylate and maleic anhydride according to procedures described below. In an autoclave having a capacity of 1 liter and equipped with a stirrer, a monomer mixture comprising 88.8% by weight of ethylene, 10.9% by weight of methyl methacrylate and 0.3% by weight of maleic anhydride and t-butylperoxy-2-ethyl hexanoate in an amount of 550 ppm based on the whole monomers were continuously fed and polymerization was continuously carried out at a temperature of 153° C. under a pressure of 1,750 kg/cm².

Similarly, several ethylene copolymers were prepared by carrying out the polymerization under conditions shown in Table 1. The obtained results are shown in Table 1.

The thus-obtained ethylene copolymers were modified with oleyl amine according to procedures described below. Namely, a modifier (see Table 2) was added to the ethylene copolymer in an amount of 1 mole or 2 moles per mole of the maleic anhydride units in the copolymer as shown in Table 1, and kneading reaction was carried out at 80° C. and 40 rpm for 20 minutes in a laboratory plastomill. The reaction ratio of oleyl amine with the maleic anhydride units in the copolymer was 64% when oleyl amine was added in an equimolar amount or 91% when oleyl amine was added in an amount of 2 moles per mole of the maleic anhydride units. Other polymers were similarly modified.

(Evaluation of Physical Properties)

The thus-obtained modified ethylene copolymer was mixed with a curing agent and a curing assistant at ratios shown in Table 2, and the mixture was kneaded at 80° C. and 80 rpm for 5 minutes in a laboratory plastomill and press-cured under curing conditions shown in Table 2.

The physical properties of the obtained cured products are shown in Table 2.

TABLE 1

|  | Example No. | | | Comparative Example No. | |
| --- | --- | --- | --- | --- | --- |
|  | 1 | 2 | 3 | 1 | 2 |
| Acrylic acid ester* | MMA | MMA | MMA | MMA | MMA |
| Polymerization temperature (°C.) | 153 | 155 | 220 | 155 | 153 |
| Polymerization pressure (kg/cm$^2$) | 1750 | 1680 | 1850 | 1780 | 1650 |
| Composition of polymer (mole %) | | | | | |
| Ethylene | 79.1 | 75.3 | 78.5 | 86.7 | 75.2 |
| Acrylic acid ester | 19.5 | 23.0 | 19.1 | 13.2 | 24.6 |
| Maleic anhydride | 1.4 | 1.7 | 2.4 | 0.11 | 0.12 |
| MI of polymer (g/10 min) | 0.8 | 32 | 2.3 | 2.1 | 45 |

*MMA: methyl methacrylate

TABLE 2

| Polymer | Modifier Kind*2 | Modifier Amount*1 | Amount (%) of bound modifier | Recipe*3 | Curing conditions Temperature (°C.) | Pressure (kg/cm$^2$) | Time (minutes) | Tensile test 100% Modulus | Strength at break (kg/cm$^2$) | Elongation at break (%) |
| --- | --- | --- | --- | --- | --- | --- | --- | --- | --- | --- |
| Example 1 | O | 1 | 64 | A | 170 | 60 | 30 | 29 | 135 | 750 |
| Example 1 | O | 2 | 91 | A | 170 | 60 | 30 | 31 | 167 | 600 |
| Example 1 | L | 2 | 73 | A | 190 | 60 | 30 | 28 | 130 | 630 |
| Example 1 | O | 1 | 64 | B | 190 | 100 | 30 | 33 | 195 | 650 |
| Example 2 | O | 1 | 70 | A | 170 | 60 | 30 | 27 | 137 | 680 |
| Example 2 | E | 2 | 85 | B | 170 | 60 | 60 | 34 | 180 | 550 |
| Example 3 | O | 1 | 63 | B | 190 | 100 | 30 | 27 | 175 | 650 |
| Example 3 | D | 3 | 95 | A | 190 | 70 | 60 | 28 | 220 | 550 |
| Example 3 | A | 1 | 55 | B | 170 | 70 | 60 | 25 | 110 | 800 |
| Comparative Example 1 | O | 1 | 60 | B | 190 | 100 | 30 | 29 | 65 | 950 |
| Comparative Example 1 | D | 2 | 65 | B | 190 | 100 | 30 | 30 | 57 | 880 |
| Comparative Example 2 | O | 2 | 85 | A | " | " | " | 22 | 43 | 900 |
| Comparative Example 2 | E | 3 | 53 | B | " | " | " | 24 | 40 | >1000 |

| Polymer | Shore hardness (A) | Tension permanent set (%) | Elongation (%) after 190° C. × 70 hours | Izod impact strength at −70° C. (kg · cm/cm) |
| --- | --- | --- | --- | --- |
| Example 1 | 63 | 6 | 410 | 87 |
| Example 1 | 64 | 5 | 380 | 92 |
| Example 1 | 63 | 6 | 390 | 75 |
| Example 1 | 66 | 7 | 380 | 77 |
| Example 2 | 63 | 7 | 375 | 65 |
| Example 2 | 70 | 5 | 320 | 70 |
| Example 3 | 64 | 4 | 365 | 80 |
| Example 3 | 73 | 8 | 310 | 43 |
| Example 3 | 62 | 10 |  | 75 |
| Comparative Example 1 | 77 | 53 | 600 | 4 |
| Comparative Example 1 | 73 | 47 | 570 | 7 |
| Comparative Example 2 | 52 | 43 | 500 | 3 |
| Comparative Example 2 | 55 | 37 | 650 | 8 |

Note
*1 1: one mole per mole of maleic anhydride
2: two moles per mole of maleic anhydride
3: three moles per mole of maleic anhydride
*2 O: oleyl amine
D: 1-amino-5-dodecene
L: lauryl alcohol
E: 1-hydro-9-octadecene
A: allyl alcohol
*3

| Recipe | A(PHR) | B(PHR) |
| --- | --- | --- |
| sulfur | 1 | 1.5 |
| Nocceler M | 5 | 5 |
| Nocceler TT | 0.5 | 0.5 |
| ZnO (zinc oxide) | 1 | 1 |
| SRF (carbon black) | 35 | 50 |
| DOS (plasticizer) | 5 | 10 |
| stearic acid | 1 | 1 |

TABLE 2-continued

| | | |
|---|---|---|
| Irganox 1010 | 0.5 | 0.5 |

EXAMPLES 4 AND 5

(Hydrolysis of Ethylene Copolymer (1))

20 g of a terpolymer comprising 79 mole% of ethylene, 18.5 mole% of methyl acrylate and 1.5 mole% of maleic anhydride (having an MI of 220 g/10 min; hereinafter referred to as "copolymer (1)") was dissolved in 200 ml of toluene. To the solution were added 100 ml of water and triethyl amine in an amount of 3 moles per mole of maleic anhydride in the copolymer. The mixture was heated (hydrolyzed) at 80° C. for 5 hours with stirring. Then, hydrochloric acid was added to effect neutralization, and hydrochloric acid was further added so that the reaction mixture became weakly acidic. The mixture was allowed to stand overnight. Then, hexane was added as a precipitating solvent to precipitate the formed polymer. Hexane was exchanged with fresh hexane several times to wash the polymer, and the polymer was vacuum-dried at 40° C. overnight. The hydrolysis ratio was calculated from decrease of the absorption at 1,760 $cm^{-1}$, attributed to the acid anhydride, in the infrared absorption spectrum (the same method was adopted in the subsequent examples). It was found that the hydrolysis ratio was 100%.

(Modification with Unsaturated Amine or Unsaturated Alcohol)

Oleyl amine was added to the hydrolyzed copolymer in an amount of 0.5 mole per mole of the dicarboxyl group in the thus-obtained hydrolysis product of the copolymer (1), and reaction was carried out while kneading the mixture at 120° C. and 40 rpm for 20 minutes in a laboratory plastomill. Oleyl amine was reacted at a ratio of 84% of the theoretical value (Example 4).

By using oleyl alchol in an amount of 1.0 mole per mole of the dicarboxyl group in the hydrolysis product of the copolymer (1) instead of oleyl amine used in Example 4, the reaction was carried out while conducting kneading under the same conditions as described in Example 1. Oleyl alcohol was reacted at a ratio of 76% of the theoretical value (Example 5).

EXAMPLES 6 AND 7

(Half Esterification of Copolymer (2))

20 g of a terpolymer comprising 72.2 mole% of ethylene, 26.8 mole% of methyl acrylate and 1.0 mole% of maleic anhydride (having an MI of 9.1 g/10 min; hereinafter referred to as "copolymer (2)") was dissolved in 200 ml of toluene, and 100 ml of methyl alcohol and 1 ml of triethyl amine were added to the solution and reaction was carried out for 6 hours under reflux of methanol. Then, the half-esterified polymer was washed and dried in the same manner as in the case of the hydrolysis product of the ethylene copolymer (1). From the result of the infrared absorption spectrum analysis conducted in the same manner as described above, it was found that the half esterification ratio was 60%.

(Modification with Unsaturated Amine or Unsaturated Alcohol)

The thus-obtained half-esterified product of the copolymer (2) was modified with oleyl amine (Example 6) or oleyl alcohol (Example 7) in the same manner as described in Example 4 or Example 2. The conversions were 85% and 78%, respectively.

EXAMPLES 8 AND 9

(Half Esterification of Copolymer (3))

A terpolymer comprising 83 mole% of ethylene, 15.5 mole% of ethyl acrylate and 1.5 mole% of maleic anhydride (having an MI of 212 g/10 min; hereinafter referred to as "copolymer (3)") was half-esterified, washed and dried in the same manner as described above with respect to the copolymer (2). It was found that the copolymer (3) was half-esterified at a ratio of 80%.

(Modification with Unsaturated Amine or Unsaturated Alcohol)

The thus-obtained half esterification product of the copolymer (3) was modified with oleyl amine (Example 8) or oleyl alcohol (Example 9) in the same manner as described in Example 4 or Example 2. The conversions were 87% and 72%, respectively.

A copolymer comprising 90 mole% of ethylene and 10 mole% of methyl methacrylate (having an MI of 250 g/10 min) was used instead of the copolymer (1) used in Example 4, and oleyl amine was added and reaction was carried out in the same manner as described in Example 4 (since the copolymer did not contain a maleic anhydride group, the copolymer was not hydrolyzed nor reacted with oleyl amine) (Comparative Example 3).

A copolymer comprising 74 mole% of ethylene and 26 mole% of methyl methacrylate (having MI of 94 g/10 min) was used instead of the copolymer (2) used in Example 6, and oleyl amine was added and reaction was carried out in the same manner as described in Example 6 (for the reason described with respect to Comparative Example 3, the copolymer was not hydrolyzed nor reacted with oleyl amine) (Comparative Example 4).

A copolymer comprising 79 mole% of ethylene, 11 mole% of methyl methacrylate and 10 mole% of maleic anhydride (having an MI of 300 g/10 min) was used instead of the copolymer (1) used in Example 4, and hydrolysis, neutralization, washing and drying were carried out in the same manner as described in Example 4. The hydrolysis ratio was 100%. In the same manner as described in Example 4, oleyl amine was added to the hydrolyzed polymer and reaction was carried out. Oleyl amine was reacted at a ratio of 80% of the theoretical value (Comparative Example 5).

A copolymer comprising 96.7 mole% of ethylene, 1.0 mole% of methyl methacrylate and 2.3 mole% of maleic anhydride (having an MI of 6.7 g/10 min) was used instead of the copolymer (1) used in Example 4, and hydrolysis, neutralization, washing and drying were carried out in the same manner as described in Example 4. The hydrolysis ratio was 100%. The hydrolyzed polymer was reacted with oleyl amine under the same conditions as described in Example 4. Oleyl amine was reacted at a ratio of 80% of the theoretical value (Comparative Example 6).

(Evaluation of Physical Properties)

Into 100 parts by weight of the thus-obtained modified ethylene copolymer were incorporated amounts shown in Table 3 of powdery sulfur capable of passing through a 200-mesh sieve (hereinafter referred to as "S"), tetramethylthiuram disulfide as the curing promoter (hereinafter referred to as "TT"), 2-mercaptobenzothiazole as the curing promoter (hereinafter referred to as "M"), dipentamethylenethiuram tetrasulfide as the sulfur donor (hereinafter referred to as "TRA"), zinc oxide as the curing promoting assistant, stearic acid as the curing promoting assistant and tetrakis(methylene-3,5-di-tert-butyl-4-hydroxy-hydrocinnamate)methane (Irganox 1010) as the antioxidant (hereinafter referred to as "1010"), and the resulting mixture was kneaded at room temperature by a two-roll mill. The obtained kneaded mixture was press-cured at 150° C. under a pressure of 60 kg/cm² for 40 minutes. The cured product was subjected to the tensile test and heat resistance test and the Shore hardness (A) and permanent elongation were determined. The obtained results are shown in Table 4.

TABLE 3

| Additives | Mixing ratio (parts by weight) | | |
|---|---|---|---|
| | Recipe A | Recipe B | Recipe C |
| Powdery sulfur | 2.0 | 2.0 | 0 |
| TT | 2.0 | 1.0 | 0 |
| M | 1.0 | 0.5 | 0 |
| TRA | 0 | 0 | 5.0 |
| Zinc oxide | 5.0 | 5.0 | 5.0 |
| Stearic acid | 2.0 | 2.0 | 2.0 |
| 1010 | 0.5 | 0.5 | 0.5 |

Note, when the tension permanent set of the test piece obtained in Comparative Example 3 was measured, the elongation was not restored to the original state. When the test pieces obtained in Comparative Examples 3 and 4 were subjected to the aging test, the test pieces were molten.

and reacted in a laboratory plastomill at 140° C. and 40 rpm for 20 minutes. The ratio of the reaction between oleyl amine and the acid (Table 6) was 63.7%. Then, the modified polymer was mixed with a curing agent and curing assistant of a recipe shown in Table 6 and the mixture was kneaded under conditions wherein the copolymer could be kneaded. Then, the kneaded composition was press-cured under conditions shown in Table 6.

The physical properties of the cured product are shown in Table 6.

EXAMPLES 11 THROUGH 13

In the same manner as described in Example 10, an ethylene/methyl acrylate/acrylic acid copolymer C-2 having a composition shown in Table 5 was treated and cured under conditions (modifiers, amounts, recipes and curing conditions) shown in Table 6. The physical properties are shown in Table 6. Note, in the modification with oleyl alcohol in Example 13, 0.01 part by weight of p-toluene-sulfonic acid was used as a catalyst.

EXAMPLES 14 THROUGH 16 AND COMPARATIVE EXAMPLE 7

An ethylene/methyl methacrylate copolymer (MI=109 g/10 min) containing 20% by weight of methyl methacrylate was mixed with 2 PHR of maleic anhydride under kneading (185° C., 40 rpm) in a laboratory plastomill, and then 0.25 PHR of dicumyl peroxide was added dividedly as 5 portions and the mixture was kneaded for 10 minutes to obtain a maleic anhydride-grafted copolymer C-3. The amount grafted of maleic anhydride was 1.35% by weight as the content.

This copolymer C-3 was modified and cured in the same manner as in Examples 10 through 13. The reaction conditions and physical properties are shown in Table 6.

TABLE 4

| | Recipe | Tensile test | | | | Shore hardness (A) | Tension permanent set (%) | Heat resistance test (elongation) (%) |
|---|---|---|---|---|---|---|---|---|
| | | 100% Modulus (kg/cm²) | 300% Modulus (kg/cm²) | Strength at break (kg/cm²) | Elongation at break (%) | | | |
| Example 4 | A | 15 | 28 | 142 | 690 | 66 | 13 | 590 |
|  | C | 14 | 27 | 140 | 700 | 65 | 12 | 650 |
| Example 5 | A | 14 | 26 | 110 | 740 | 65 | 13 | 670 |
| Example 6 | A | 8 | 17 | 128 | 700 | 60 | 7 | 650 |
|  | A | 10 | 23 | 134 | 680 | 62 | 9 | 630 |
|  | B | 9 | 20 | 110 | 650 | 59 | 8 | 620 |
|  | C | 7 | 17 | 98 | 650 | 58 | 7 | 630 |
| Example 7 | A | 8 | 17 | 128 | 720 | 59 | 7 | 650 |
| Example 8 | A | 18 | 29 | 145 | 660 | 69 | 15 | 550 |
|  | B | 19 | 32 | 99 | 670 | 70 | 17 | 570 |
| Example 9 | A | 18 | 29 | 78 | 620 | 69 | 18 | 550 |
|  | B | 16 | 27 | 69 | 650 | 69 | 19 | 560 |
| Comparative Example 3 | A | 20 | 19 | 17 | 270 | 69 | 140 | — |
| Comparative Example 4 | A | 4 | 42 | 4 | 2500 | 43 | 2000 | — |
| Comparative Example 5 | A | 34 | 50 | 60 | 430 | 45 | 80 | 350 |
| Comparative Example 6 | A | 68 | 82 | 246 | 540 | 72 | 300 | 480 |

Note: *Curing time was 60 minutes.

EXAMPLE 10

An ethylene/methyl methacrylate/methacrylic acid copolymer C-1 having a composition shown in Table 5, which was prepared by partially hydrolyzing an ethylene/methyl methacrylate copolymer, was mixed with a modifier (oleyl amine) in an amount equimolar to the methacrylic acid units, and the mixture was kneaded

EXAMPLE 17

A maleic anhydride-grafted copolymer C-4 was used in the same manner as described in Example 14 except that an ethylene/methyl methacrylate copolymer having a methyl methacrylate content of 48.0% by weight was used as the base polymer. The thus-obtained polymer was modified and cured in the same manner as described in Example 10. The physical properties are shown in Table 6.

EXAMPLE 18 AND COMPARATIVE EXAMPLE 8

An ethylene/methyl methacrylate/glycidyl methacrylate copolymer C-5 having a composition shown in Table 5 or an ethylene/glycidyl methacrylate copolymer C-5- Comparison having a composition shown in Table 5 was modified and cured in the same manner as described in Example 10. The obtained results are shown in Table 6.

EXAMPLES 19 AND 20 AND COMPARATIVE EXAMPLES 9 AND 10

An ethylene/methyl methacrylate/maleic anhydride copolymer C-6 having a composition shown in Table 5 or an ethylene/methyl methacrylate/monoethyl maleate copolymer C-7 having a composition shown in Table 5 was reacted with oleyl amine in the same manner as described in Example 10. The amount of oleyl amine reacted was equimolar to the maleic anhydride groups, and the conversion was 85% or 87%. The thus-obtained oleyl amine-modified copolymer was mixed with 2 PHR of dicumyl peroxide, and the mixture was kneaded at 100° C. and 40 rpm for 3 minutes. The kneaded composition was press-crosslinked under conditions shown in Table 7. The physical properties of the thus-obtained crosslinked product are shown in Table 7 (Examples 19 and 20). When the peroxide was not added, the polymer was not crosslinked and was molten even at 110° C. (Comparative Examples 9 and 10).

EXAMPLE 21

An ethylene/methyl acrylate/octadecenyl acrylate copolymer C-8 having a composition shown in Table 5 was modified and cured in the same manner as described in Example 10. Conditions, mixing ratios and physical properties are shown in Table 7.

EXAMPLE 22

An ethylene/methyl acrylate/maleic anhydride copolymer C-9 having a composition shown in Table 5 and oleyl amine in an amount equimolar to the maleic anhydride groups in the copolymer C-9 were dissolved in toluene, and the solution was refluxed for 2 hours. The solution was added to methanol to precipitate a polymer. The polymer was recovered by filtration and the solvent was removed by evaporation. The conversion was 87%. The modified copolymer was cured under additive and curing conditions shown in Table 7. The physical properties are shown in Table 7.

EXAMPLE 23

The modified copolymer obtained in Example 22 was allowed to stand in an atmosphere maintained at 200° C. for 6 hours. By this operation, an imide structure was formed and the physical properties and heat resistance of the cured product were improved Absorptions at 1640 cm$^{-1}$ and 1540 cm$^{-1}$, attributed to the amide, disappeared, and an absorption of the imide appeared at 1700 cm$^{-1}$.

COMPARATIVE EXAMPLE 11

The copolymer C-9 was modified with stearyl amine, which is a saturated amine, in the same manner as described in Example 22. Curing of the polymer was attempted under additive and curing conditions shown in Table 7, but the polymer could not be cured (molten at 110° C.).

TABLE 5

| Compolymer No. | Third comonomer | Content (mole %) | Second comonomer | Content (mole %) | Remarks | MI (g/10 min) |
|---|---|---|---|---|---|---|
| C-1 | MAA | 0.95 | MMA | 5.7 | | 109 |
| C-2 | AA | 1.2 | MA | 25.0 | | 45.2 |
| C-3 | MAH (grafted) | 0.46 | MMA | 6.6 | MAH grafted to E/MMA copolymer | 3.6 |
| C-4 | MAH (grafted) | 0.67 | MMA | 20.9 | MAH grafted to E/MMA copolymer | 7.3 |
| C-5- Comparison | GMA | 12.2 | — | 0 | | 3.0 |
| C-5 | GMA | 2.3 | MMA | 20.7 | | 12.3 |
| C-6 | MAH | 1.4 | MMA | 6.9 | | 64.3 |
| C-7 | MAH monoethyl ester | 1.0 | MA | 30.1 | | 10.3 |
| C-8 | Octadecenyl acrylate | 0.27 | MA | 25.9 | Octadecenyl acrylate directly copolymerized | 55.2 |
| C-9 | MAH | 0.97 | MA | 28.3 | | 9.1 |

MAA: methacrylic acid
MMA: methyl methacrylate
MA: methyl acrylate
AA: acrylic acid
MAH: maleic anhydride
GMA: glycidyl methacrylate
E: ethylene

TABLE 6

| | Co-polymer | Modifier | | | | Curing conditions | | | Tensile test | | | |
| | | Kind *1 | Amount *2 | Conversion *3 (%) | Recipe *4 | Temperature (°C.) | Time (minutes) | Pressure (kg/cm$^2$) | 100% Modulus (kg/cm$^2$) | 300% Modulus (kg/cm$^2$) | Strength at break (kg/cm$^2$) | Elongation at break (%) |
|---|---|---|---|---|---|---|---|---|---|---|---|---|
| Example 10 | C-1 | OAm | 1.0 | 63.7 | A | 150 | 40 | 60 | 50.9 | 57.4 | 87.6 | 580 |
| Example 11 | C-2 | OAm | 1.0 | 68 | A | " | " | " | 12.2 | 35.6 | 120.7 | 660 |

TABLE 6-continued

| | | | | | | | | | | | | |
|---|---|---|---|---|---|---|---|---|---|---|---|---|
| Example 12 | C-2 | OAm | 1.0 | 68 | C | " | " | " | 10.2 | 25.8 | 135.2 | 630 |
| Example 13 | C-2 | OAl | 1.0 | 53 | A | " | " | " | 9.8 | 25.3 | 85.0 | 720 |
| Example 14 | C-3 | OAm | 0.9 | 85 | A | " | " | " | 47.5 | 58.1 | 123.1 | 630 |
| Example 15 | C-3 | OAm | 0.9 | 85 | C | " | " | " | 49.2 | 55.4 | 130.1 | 610 |
| Comparative Example 7 | C-3 | OAm | 0.0 | — | A | " | " | " | 43.6 | 45.6 | 49.5 | 300 |
| Example 16 | C-3 | OAl | 1.0 | 48 | A | " | " | " | 44.4 | 51.2 | 102.7 | 620 |
| Example 17 | C-4 | OAm | 0.9 | 82 | A | " | " | " | 18.2 | 27.2 | 140.3 | 700 |
| Comparative Example 8 | C-5-Comparison | MAA | 0.4 | 65 | B | 150 | 30 | 60 | 72.0 | 102.5 | 182 | 720 |
| Example 18 | C-5 | MAA | 0.6 | 63 | B | " | " | " | 16.1 | 41.7 | 136.6 | 550 |

| | Shore hardness (A) | Tension permanent set *5 (%) | Heat aging test *6 (%) | Remarks |
|---|---|---|---|---|
| Example 10 | 86 | 150 | 320 | Saponification of copolymer |
| Example 11 | 60 | 14 | 390 | Direct copolymerization |
| Example 12 | 58 | 16 | 390 | |
| Example 13 | 58 | 20 | 420 | |
| Example 14 | 87 | 140 | 380 | Grafting with maleic anhydride |
| Example 15 | 86 | 130 | 410 | |
| Comparative Example 7 | 85 | Measurement impossible | Molten | |
| Example 16 | 87 | 150 | 370 | |
| Example 17 | 60 | 21 | 400 | |
| Comparative Example 8 | 92 | 400 | 390 | |
| Example 18 | 61 | 18 | 330 | |

Note
*1 OAm: oleyl amine
OAl: oleyl alcohol
MAA: methacrylic acid
DCP: dicumyl peroxide
*2 moles per mole of second comonomer, but PHR in case of DCP
*3 determined according to IR method
*4 Recipes (PHR)
A: S(2), TT(2), M(1), ZnO(5), stearic acid(2)
B: S(2), TT(1), M(0.5), ZnO(5), stearic acid(2)
C: TRA(5), ZnO(5), stearic acid(2)
(Tetron A)
*5 Sample was elongated at ratio of 50% of elongation at break, maintained for 10 minutes and then shrunk, and elongation was measured after lapse of 10 minutes
*6 elongation after 190° C. for 70 hours

TABLE 7

(Peroxide curing)

| | | Modifier | | | Curing conditions | | | Tensile test | | | |
|---|---|---|---|---|---|---|---|---|---|---|---|
| | Co-polymer | Kind *1 | Amount (PHR) | Conversion (%) | Recipe | Temperature (°C.) | Time (minutes) | Pressure (kg/cm²) | 100% Modulus (kg/cm²) | 300% Modulus (kg/cm²) | Strength at break (kg/cm²) | Elongation at break (%) |
| Example 19 | C-6 | DCP | 2 | — | — | 170 | 30 | 60 | 40.5 | 48.5 | 80.0 | 610 |
| Comparative Example 9 | C-6 | — | 0 | — | — | 170 | 30 | 60 | 34.0 | 35.0 | 37.5 | 640 |
| Example 20 | C-7 | DCP | 2 | — | — | 170 | 30 | 60 | 4.5 | 5.7 | 27.1 | 850 |
| Comparative Example 10 | C-7 | — | 0 | — | — | 170 | 30 | 60 | 3.1 | 2.8 | 1.0 | 2900 |
| Example 21 | C-8 | — | — | — | B | 150 | 30 | 60 | 16.3 | 38.3 | 156 | 650 |
| Comparative Example 11 | C-9 | SAm | 1.0 | . | B | 150 | 30 | 60 | 6.5 | 9.7 | 41.5 | 1450 |
| Example 23 | C-9 | OAm | 1.0 | | B | 150 | 30 | 60 | 14.0 | 39.1 | 200.9 | 590 |
| Example 22 | C-9 | OAm | 1.0 | | B | 150 | 30 | 60 | 11.9 | 29.7 | 167.0 | 670 |

| | Shore hardness (A) | Tension permanent set (%) | Heat aging test (%) | Remarks |
|---|---|---|---|---|
| Example 19 | 84 | 140 | 450 | Crosslinking with OAm-peroxide |
| Comparative Example 9 | 82 | 280 | Molten | |
| Example 20 | 58 | 15 | 620 | Crosslinking with OAm-peroxide |
| Comparative Example 10 | 42 | Measurement impossible | Molten | |
| Example 21 | 65 | 25 | 410 | Direct copolymerization |
| Comparative Example 11 | 520 | Above 1000 | Molten | Not cured |
| Example 23 | 59 | 11 | 490 | Imide modification |

TABLE 7-continued

| | (Peroxide curing) | | | |
|---|---|---|---|---|
| Example 22 | 60 | 15 | 410 | Amide modification |

Note
*1 DCP: dicumyl peroxide
SAm: stearyl amine
OAm: oleyl amine

We claim:
1. A cured produce prepared by curing a random multiplex ethylene copolymer comprising (a) 53 to 86.6 mole% of units derived from ethylene, which are represented by the following formula (I):

$$-CH_2-CH_2-tm \quad (I)$$

(b) 5 to 45 mole% of units derived from a monomer selected from alkyl acrylates, alkyl methacrylates, vinyl carboxylates and isopropenyl carboxylates, which are represented by the following formula (II):

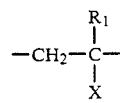
$$\begin{array}{c} R_1 \\ | \\ -CH_2-C- \\ | \\ X \end{array} \quad (II)$$

wherein $R_1$ stands for a hydrogen atom or a methyl group, and X is

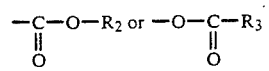
$$-C-O-R_2 \text{ or } -O-C-R_3$$

in which $R_2$ and $R_3$ stand for an alkyl group having 1 to 10 carbon atoms), and (c) 0.2 to 5 mole% of units derived from a monomer having a radical-polymerizable ethylenic double bond and at least one carbon-to-carbon double bond which is different from a double bond of an aromatic nucleus, with at least one curing agent selected from sulfur, sulfur donors and peroxides, wherein the units (c) derived from the radical-polymerizable monomer are represented by the following formula (III):

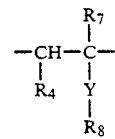
$$\begin{array}{c} R_7 \\ | \\ -CH-C- \\ | \quad | \\ R_4 \quad Y \\ | \\ R_8 \end{array} \quad (III)$$

wherein $R_4$ stands for a hydrogen atom or

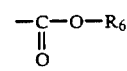
$$-C-O-R_6$$

(in which $R_6$ stands for a hydrogen atom or an alkyl group having 1 to 6 carbon atoms), $R_7$ stands for a hydrogen atom or a methyl group, $R_8$ stands for a hydrocarbon residue having at least one carbon-to-carbon double bond different from a double bond of an aromatic nucleus and having up to 40 carbon atoms, and Y is a divalent group selected from divalent groups represented by the following formulas (IV) through (IX):

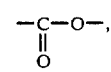
$$-C-O-, \quad (IV)$$

$$-O-C-, \quad (V)$$

$$-O-, \quad (VI)$$

$$\begin{array}{c} -C-N- \\ \| \quad | \\ O \quad R_9 \end{array} \quad (VII)$$

$$\begin{array}{c} O \\ \| \\ -C-O-CH_2-CH-CH_2-Q- \\ | \\ OH \end{array} \quad (VIII)$$

and $$\begin{array}{c} O \\ \| \\ -C-O-CH_2-CH-Q- \\ | \\ CH_2OH \end{array} \quad (IX)$$

wherein Q in the formulae (VIII) and (IX) is $$-O-C- \text{ or } -O-,$$

and $R_9$ in the formula (VII) and the definition of Q stands for a hydrocarbon residue having at least one carbon-to-carbon double bond different from a double bond of an aromatic nucleus and up to 40 carbon atoms, an alkyl, aryl or aralkyl group having up to 20 carbon atoms or a hydrogen atom,
wherein said random multiplex ethylene copolymer is prepared by one of the following three processes:
(i) a process comprising polymerizing a monomer mixture comprised of (a) ethylene, (b) the monomer for forming the units represented by the formula (II), and (c) the monomer having a radical-polymerizable ethylenic double bond and at least one carbon-to-carbon double bond which is different from a double bond of an aromatic nucleus:
(ii) a process comprising polymerizing a monomer mixture comprised of (a) ethylene, (b) the monomer for forming the units represented by the formula (II), and (c) the monomer having a radical-polymerizable ethylenic double bond and a functional group selected from the group consisting of an acid anhydride group, a carboxyl group and an epoxy group, and modifying the thus-obtained copolymer with a low molecular-weight modifier having an amino group, a hydroxyl group or a carboxyl group which are capable of reacting with the functional group to introduce a carbon-to-carbon double bond in side chains of the copolymer, and
(iii) a process comprising polymerizing a monomer mixture comprised of (a) ethylene and (b) the monomer for forming the units represented by the formula (II), graft-polymerizing the monomer having a radical-polymerizable ethylenic double bond and a functional group selected from the group consisting of an acid anhydride group, a carboxyl group and an epoxy group, onto thus-obtained copolymer, and modifying the thus-obtained graft-copolymer with a low molecular-weight modifier having an amino group, a hydroxyl group or a carboxyl group which are capable of reacting with the functional group to introduce a carbon-to-carbon double bond in side chains of the copolymer.

2. A cured product prepared by curing a random multiplex ethylene copolymer comprising (a) 53 to 86.6 mole% of units derived from ethylene, which are represented by the following formula (I):

$$-CH_2-CH_2- \qquad (I)$$

(b) 5 to 45 mole% of units derived from a monomer selected from alkyl acrylates, alkyl methacrylates, vinyl carboxylates and isopropenyl carboxylates, which are represented by the following formula (II):

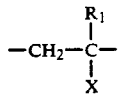
(II)

wherein $R_1$ stands for a hydrogen atom or a methyl group, and X is

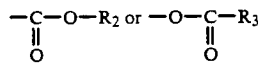

(in which $R_2$ and $R_3$ stand for an alkyl group having 1 to 10 carbon atoms), and (c) 0.2 to 5 mole% of units derived from a monomer having a radical-polymerizable ethylenic double bond and at least one carbon-to-carbon double bond which is different from a double bond of an aromatic nucleus, with at least one curing agent selected from sulfur, sulfur donors and peroxides, wherein the units (c) derived from the radical-polymerizable monomer are selected from units represented by the following formulae (X), (XI), (XII) and (XVI);

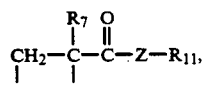
(X)

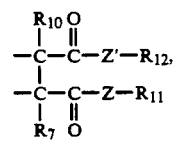
(XI)

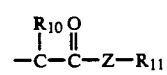
(XII)

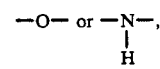 and

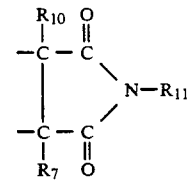
(XVI)

wherein $R_7$ and $R_{10}$ stand for a hydrogen atom or a methyl group, $R_{11}$ stands for a hydrocarbon residue having a carbon-to-carbon double bond different from a double bond of an aromatic nucleus and having 6 to 20 carbon atoms, $R_{12}$ stands for a hydrogen atom or an alkyl group having 1 to 10 carbon atoms, and Z and Z' independently stand for $$-O- \text{ or } -\underset{H}{N}-,$$

wherein said random multiplex ethylene copolymer is prepared by one of the following three processes:
  (i) a process comprising polymerizing a monomer mixture comprised of (a) ethylene, (b) the monomer for forming the units represented by the formula (II), and (c) the monomer having a radical-polymerizable ethylenic double bond and at least one carbon-to-carbon double bond which is different form a double bond of an aromatic nucleus:
  (ii) a process comprising polymerizing a monomer mixture comprised of (a) ethylene, (b) the monomer for forming the units represented by the formula (II), and (c) the monomer having a radical-polymerizable ethylenic double bond and a functional group selected from the group consisting of an acid anhydride group, a carboxyl group and an epoxy group, and modifying the thus-obtained copolymer with a low molecular-weight modifier having an amino group, a hydroxyl group or a carboxyl group which are capable of reacting with the functional group to introduce a carbon-to-carbon double bond in side chains of the copolymer, and
  (iii) a process comprising polymerizing a monomer mixture comprised of (a) ethylene and (b) the monomer for forming the units represented by the formula (II), graft-polymerizing the monomer having a radical-polymerizable ethylenic double bond and a functional group selected from the group consisting of an acid anhydride group, a carboxyl group and an epoxy group, onto thus-obtained copolymer, and modifying the thus-obtained graft-copolymer with a low molecular-weight modifier having an amino group, a hydroxyl group or a carboxyl group which are capable of reacting with the functional group to introduce a carbon-to-carbon double bond in side chains of the copolymer.

* * * * *